United States Patent [19]

Sugasawa et al.

[11] Patent Number: 4,717,173
[45] Date of Patent: Jan. 5, 1988

[54] SUSPENSION CONTROL SYSTEM FOR AUTOMOTIVE VEHICLE SUSPENSION SUPPRESSING BOUNCING

[75] Inventors: Fukashi Sugasawa; Junsuke Kuroki; Yohsuke Akatsu, all of Yokohama, Japan

[73] Assignee: Nissan Motor Company, Limited, Kanagawa, Japan

[21] Appl. No.: 23,923

[22] Filed: Mar. 9, 1987

Related U.S. Application Data

[63] Continuation of Ser. No. 744,379, Jun. 13, 1985, abandoned.

[30] Foreign Application Priority Data

Jun. 14, 1984 [JP] Japan .................. 59-122828

[51] Int. Cl.[4] .............................................. B60G 17/08
[52] U.S. Cl. .................................................. 280/707
[58] Field of Search ................ 280/707, 703, DIG. 1, 280/6 R, 689, 709; 188/299

[56] References Cited

U.S. PATENT DOCUMENTS

| | | | |
|---|---|---|---|
| 3,003,783 | 10/1961 | Brueder | 280/707 |
| 3,029,089 | 4/1962 | Nashman | 280/709 |
| 3,603,612 | 9/1971 | Hill | 280/707 |
| 3,677,561 | 7/1972 | McNally | 280/709 |
| 3,827,538 | 8/1974 | Morgan | 188/299 |
| 3,902,691 | 9/1975 | Ott | 280/6 H |
| 3,920,283 | 11/1975 | Strader | 280/6 R |
| 3,995,883 | 12/1976 | Glaze | 280/707 |
| 4,065,154 | 12/1977 | Glaze | 280/707 |
| 4,105,216 | 8/1978 | Graham et al. | 280/707 |
| 4,327,936 | 5/1982 | Sekiguchi | 280/711 |
| 4,349,077 | 9/1982 | Sekiguchi | 280/707 |
| 4,401,310 | 8/1983 | Ishikawa et al. | 280/707 |
| 4,402,375 | 9/1983 | Glaze | 280/707 |
| 4,506,909 | 3/1985 | Nakashima et al. | 280/707 |

FOREIGN PATENT DOCUMENTS

| | | |
|---|---|---|
| 0027869 | 5/1981 | European Pat. Off. . |
| 0091017 | 10/1983 | European Pat. Off. . |
| 2053649 | 5/1972 | Fed. Rep. of Germany . |
| 2844028 | 4/1980 | Fed. Rep. of Germany ...... 280/689 |
| 46-3879 | 2/1971 | Japan . |
| 50-40970 | 4/1975 | Japan . |
| 53-26021 | 3/1978 | Japan . |
| 55-114708 | 8/1980 | Japan . |
| 55-141085 | 10/1980 | Japan . |
| 56-31861 | 3/1981 | Japan . |

(List continued on next page.)

OTHER PUBLICATIONS

Richman, Eric, "A Guide to Dirt Track Suspensions", *Circle Track*, pp. 78–87.
Abstract of Japanese Application No. 57-172556.
A. G. Thompson et al., SAE Technical Paper Series #800520, "An Optimal Linear Active Suspension with Finite Road Preview", 1980.
SAE #680750, "Some Fundamental Limitations of Active and Passive Vehicle Suspension Systems", Erich K. Bender, Oct. 1968.

*Primary Examiner*—John J. Love
*Assistant Examiner*—Karin L. Ferriter
*Attorney, Agent, or Firm*—Schwartz, Jeffery, Schwaab, Mack, Blumenthal & Evans

[57] ABSTRACT

A suspension control system is able to precisely adapt damping characteristics to the road condition, even when the vehicle passes over bump, manhole, hole and so forth. The suspension control system includes a road sensor which produces a road condition indicative signal. A controller is adapted to recognize bump, manhole, hole and so forth which causes temporary bounding and rebounding motion for the vehicle, on the basis of the road condition indicative signal from the road sensor. The controller produces a control signal to harden damping characteristics of suspension when bump, manhole, hole and so forth is detected with a given delay time. The delay time for changing damping characteristics is different at the front and rear suspension from each other so that each of the front and rear suspension can be stiffened at a good timing.

24 Claims, 16 Drawing Figures

FOREIGN PATENT DOCUMENTS

| | | |
|---|---|---|
| 56-42739 | 4/1981 | Japan . |
| 56-153267 | 11/1981 | Japan . |
| 57-172808 | 10/1982 | Japan . |
| 57-182506 | 11/1982 | Japan . |
| 30542 | 2/1983 | Japan . |
| 58-93615 | 6/1983 | Japan . |
| 58-149815 | 9/1983 | Japan . |
| 58-182571 | 10/1983 | Japan . |
| 58-189573 | 11/1983 | Japan . |
| 59-50242 | 3/1984 | Japan . |
| 58-124710 | 8/1984 | Japan . |
| 61-18512 | 1/1986 | Japan . |
| 61-37515 | 2/1986 | Japan . |
| 61-64517 | 4/1986 | Japan . |
| 1210712 | 10/1970 | United Kingdom . |
| 1485003 | 9/1977 | United Kingdom . |
| 2006131 | 5/1979 | United Kingdom ................ 280/689 |
| 2119473 | 11/1983 | United Kingdom . |

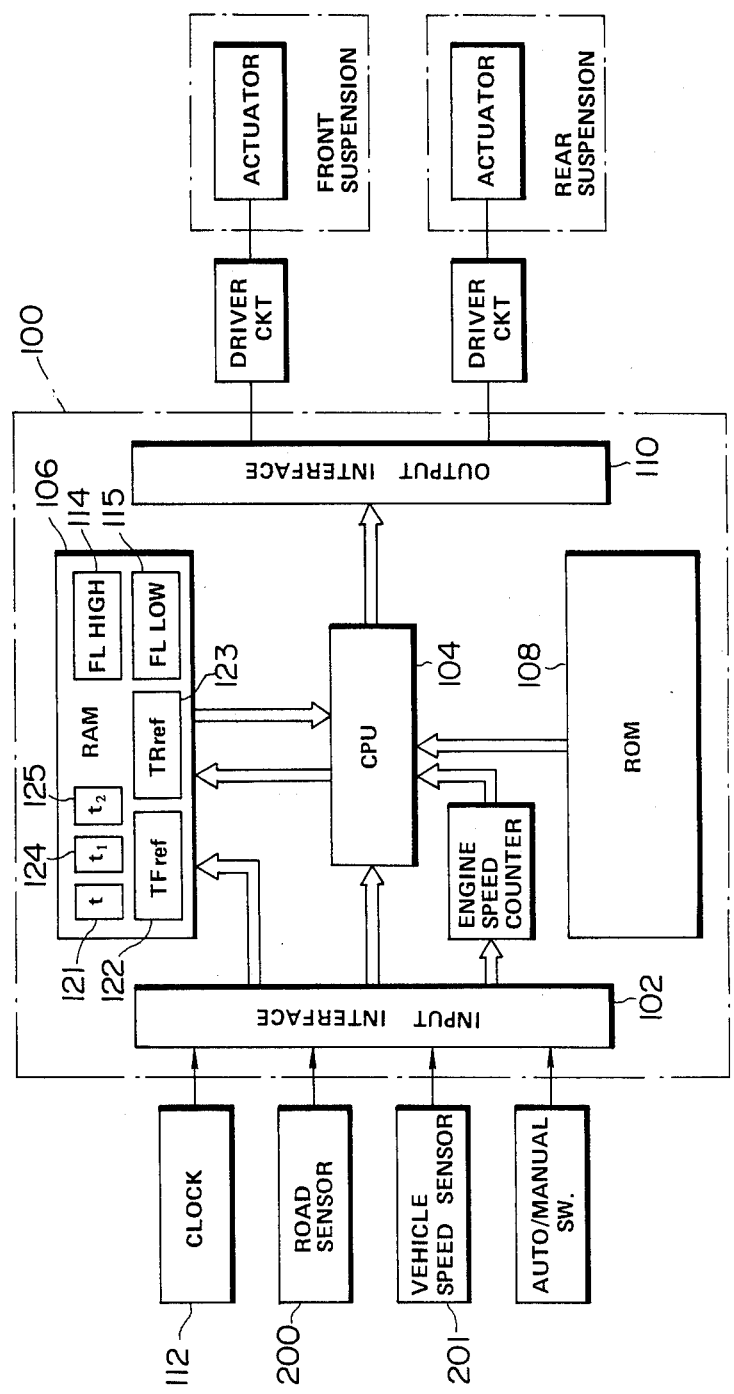

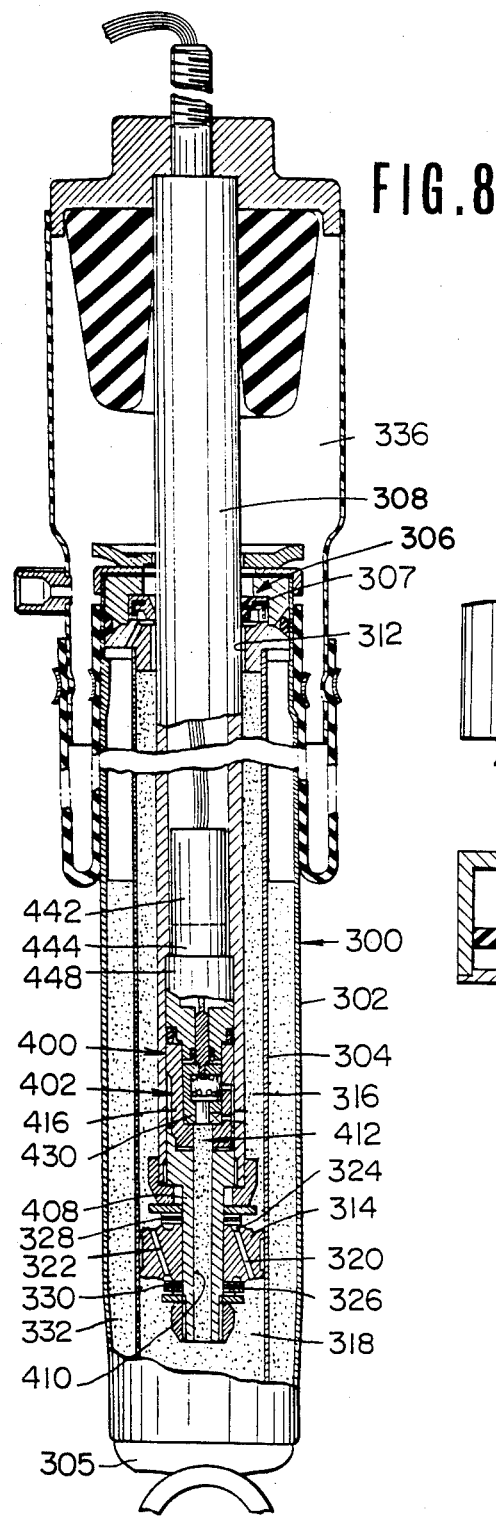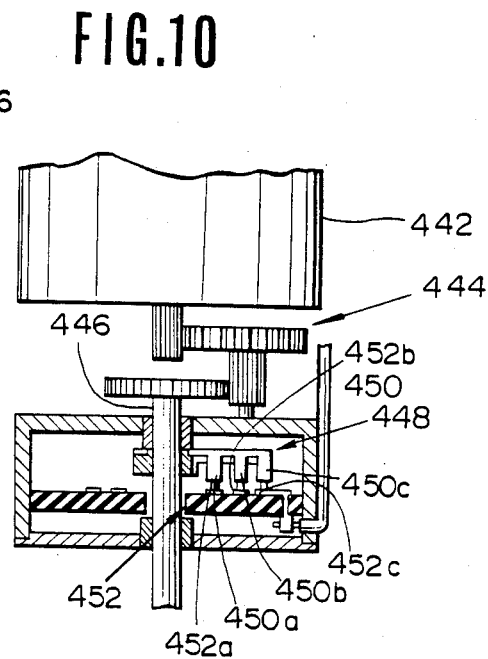
FIG. 8
FIG. 10

SUSPENSION CONTROL SYSTEM FOR AUTOMOTIVE VEHICLE SUSPENSION SUPPRESSING BOUNCING

This application is a continuation of application Ser. No. 744,379, filed June 13, 1985, now abandoned.

BACKGROUND OF THE INVENTION

The present invention generally comprises a bouncing suppresses suspension control system which suppressive bouncing of the vehicle occuring when the vehicle passes over a bump, manhole projecting from the road surface, hole and so forth which causes temporary bounding and/or rebounding motion on the vehicle and which will be referred to hereafter as "bump". More specifically, the invention relates to a suspension control system which assures riding comfort by precisely performing bouncing suppressive suspension control to vary damping characteristics of front and rear suspension systems independently of each other.

Various uses of road preview sensors have been proposed and developed. Fro example, SAE Technical Paper Series Nos. 630750 and 800520, respectively published on October, 1968 and February, 1980 show road preview sensors for use in suspension systems for obtaining optimum riding comfort and drivability. In addition, Japanese Patent First Publication No. 57-172808, published on Oct. 23, 1982 discloses a vehicle height control system which includes a sensor which detects rough road conditions and adjusts the vehicle height level depending upon road surface conditions. A vehicle height a level sensor is employed in the disclosed vehicle height control system for monitoring the relative displacement between the vehicle body and wheel axle. The output of the vehicle level sensor is compared with a reference level, which serves as a rough road criterion, and adjusts the vehicle height according to the road surface conditions.

Japanese Patent First Publication No. 58-30542, published on Feb. 23, 1983, discloses a variable damping force shock absorber with damping characteristics varying in accordance with vehicle driving conditons. In the disclosed system, the magnitude of relative displacement between the vehicle body and wheel axle is measured and a vehicle height variation indicative signal is derived from the measured displacement and the instantaneous vehicle speed. The vehicle height variation indiciative signal value is compared with a reference value which serves as a staff suspension criterion for adjustment of the damping characteristics of the shock absorber in accordance therewith.

On the other hand, Published Japanese Patent Application (Tokkai) No. Sho. 56-42739 discloses a suspension control system which controls the damping force produced in response to rolling forces depending upon vehicle speed and steering adjustments. The damping force is so controlled as to be HIGH when the vehicle speed is higher than a set speed and the steering adjustments through greater than a predetermined angle are performed. In addition, the owner of the present application has already disclosed a suspension control system in Published Japanese Utility Model Application (Jikkai) No. Sho. 56-147107. In this system, the damping force produced by a suspension shock absorber is adjusted between HIGH and LOW levels depending upon the vehicle speed, the magnitude of steering adjustments and the angular velocity of steering adjustments.

In such prior art, road condition dependent suspension control has been performed according to the road surface condition indicative parameter. Such prior art suspension control systems achieve driving stability of the vehicle and riding comfort to some extent. However, in the prior it has been difficult to perform road condition dependent suspension control in a precise manner so as to adapt damping characteristics or stiffness of the suspension precisely depending upon the road surface condition.

A typical defect or drawback of the conventional systems is apparent when the vehicle passes over a bump, manhole projecting from the road surface or a hole formed in the road. In such case, it is required to harden or stiffen the suspension for maintain damping characteristics hard enough for driving stability. Such demand for hard suspension temporarily occurs when passing over the bump, manhole or hole on the road surface and thereafter terminates. Since the conventional suspension control system controls damping characteristics solely depending upon amplitude of unevenness of the vehicle, such bump, manhole, or hole on the road surface cannot be distinguished from undulations, gravel or a rough road.

Furthermore, since the conventional control system controls the suspension to harden the damping characteristics of the suspension with electronic or and mechanical lag time, the change of damping characteristics is delayed for a certain period. This lag time prevents the conventional suspension control systems for performing control precisely adapted to the road surface condition. In addition, when the road surface sensor is provided at a position corresponding to either the front or rear suspension, the lag will cause a substantial delay in the change of the damping characteristics to harden the suspension after passing over the bump, manhole or hole. On the other hand, when the road condition sensor is provided at the front end of the vehicle, hardening of the suspension occurs in advance of passing the bump, manhole or hole. This is still not satisfactory in controlling the suspension in a precise manner.

SUMMARY OF THE INVENTION

Therefore, it is an object of the invention to provide a suspension control system which can precisely adapt damping characteristics to the road condition.

Another and more specific object of the invention is to provide a suspension control system which assures riding comfort even when the vehicle passes over a bump, manhole, hole and so forth.

In order to accomplish the aforementioned and other objects, a suspension control system, according to the invention, includes a road sensor which produces a road condition indicative signal. A controller is adapted to recognize a bump, manhole, hole and so forth which causes temporary bounding and rebounding motion of the vehicle, on the basis of the road condition indicative signal from the road sensor. The controller produces a control signal to harden the damping characteristics of the suspension when the bump, manhole, hole and so forth is detected with a given delay time. The delay time for changing the damping characteristics is different at the front and rear suspensions from each other so that each of the front and rear suspensions can be stiffened at the proper time.

In practice, the suspension control system varies a criteria of bounding magnitude across which damping characteristics are varied, depending upon a vehicle speed. For instance, when vehicle speed increases, the bounding magnitude criteria is lowered to increase sensing ability of the bounding to assure driving stability.

The suspension control system is further adapted to maintain the damping characteristics of the suspension at a hardened level for a given period after passing over the bump. This will successfully prevent the suspension control system from causing hunting while passing through an undulation road, gravel and so forth.

According to one aspect of the invention, a suspension control system for a vehicle comprises front and rear suspension systems with variable damping characteristics at least in a first mode where relatively low damping characteristics are obtained and a second mode where relatively high damping characteristics are obtained, the operation mode of the front and rear suspension systems being independently variable relative to each other, a road sensor monitoring road surface condition and producing a road condition indicative signal, a controller for determining the operation mode of the front and rear suspensions on the basis of the road condition indicative signal to produce control signals for controlling the front and rear suspensions independently of each other, the controller being responsive to the road condition indicative signal having a value greater than a predetermined threshold value to output the control signal for controlling the front suspension to the second mode with a given first delay time and to output the control signal for controlling the rear suspension to the second mode with a given second delay time, which first and second delay times are determined depending upon a dimensional relationship of the road sensor, the front suspension and the rear suspension.

According to another aspect of the invention, a method is provided for controlling damping characteristics of front and rear vehicular suspension systems, each of which has variable damping characteristics according to a preselected suspension control parameter, comprising the steps of monitoring the road surface condition and producing a road surface indicative signal, detecting an irregularity of the road surface which has a magnitude greater than a predeterined criteria, controlling damping characteristics of the front suspension system to the first mode with a given first delay time from a time at which the irregularity of the road surface is determined to have a greater magnitude than the criteria, and controlling damping characteristics of the rear suspension system to the first mode with a given second delay time from a time at which the irregularity of the road surface is determined to have a greater magnitude than the criteria.

BRIEF DESCRIPTION OF THE DRAWINGS

The present invention will be understood more fully from the detailed description given herebelow and from the accompanying drawings of the preferred embodiments of the invention, which, however, should not be taken to limit the inventio to the specific embodiments but are for explanation and understanding only.

The following drawings, throughout which like numerals refer to like elements, may be of assistance in understanding the concepts behind the present invention and the structure, function and purpose of some preferred embodiments thereof:

In the drawings:

FIG. 1 is a perspective view of an automotive vehicle with a typical vehicular suspension system and a first preferred embodiment of a suspension control system in accordance with the present invention;

FIG. 2 is a block diagram of the suspension control system of FIG. 1;

FIG. 3 is a more detailed block diagram of the road sensor of FIG. 3;

FIG. 4 is a flowchart of an road sensor timing control program executed by the controller of FIGS. 2 and 3;

FIG. 5 is a flowchart of a suspension control program to be executed by the first embodiment of suspension control system according to the invention;

FIG. 6 is a longitudinal section through a shock absorber used in the first preferred embodiment;

FIG. 7 is a timing chart showing operation of the first embodiment of the suspension control system;

FIG. 8 is a longitudinal section of a modified shock absorber which is applicable for the first embodiment of the suspension control system of the invention;

FIG. 9 is a partial longitudinal section through a modified shock absorber;

FIG. 10 is an enlarged longitudinal section through the damping force adjusting mechanism of FIG. 9;

Figure 9:
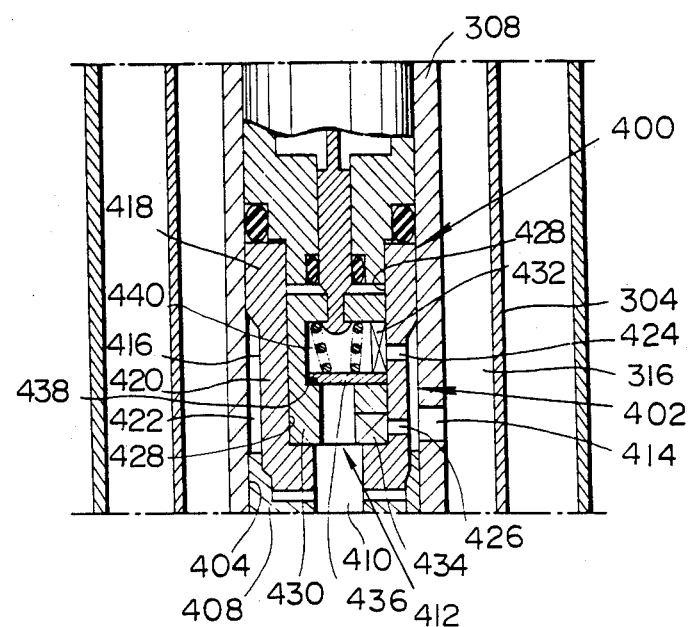
Figure 11A:
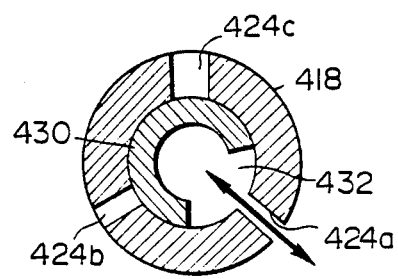
Figure 11B:
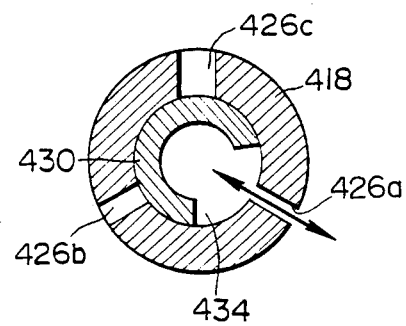
Figure 12:
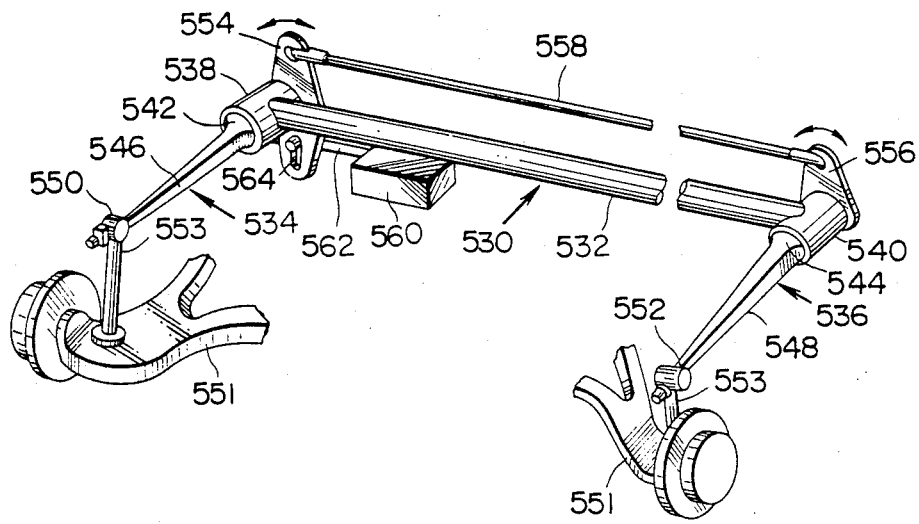
Figure 13:
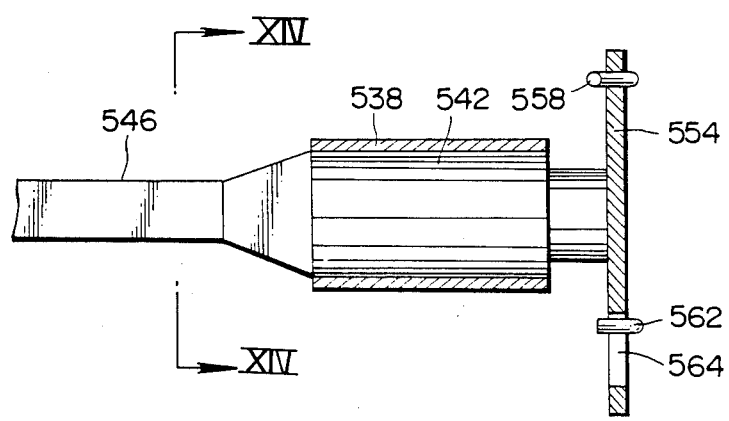
Figure 14:
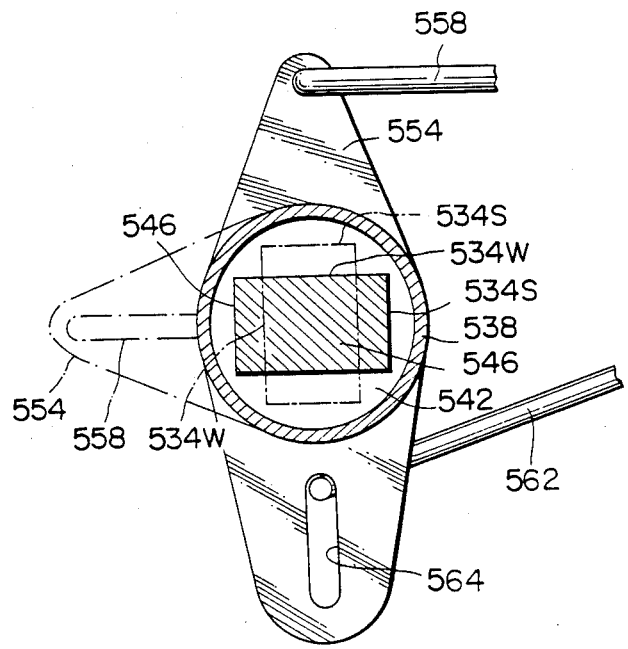

FIGS. 11(A) and 11(B) are cross-sections through the mechanism shown in FIG. 9 at positions revealing the three possible fluid flow paths;

FIG. 12 is a fragmentary perspective view of a vehicular roll stabilizer in a suspension system, to which the present invention of a suspension control is applicable;

FIG. 13 is an enlarged side elevation showing a major part of the roll stabilizer of FIG. 14;

FIG. 14 is a cross-section taken along line A—A of FIG. 12; and

Figure 15:
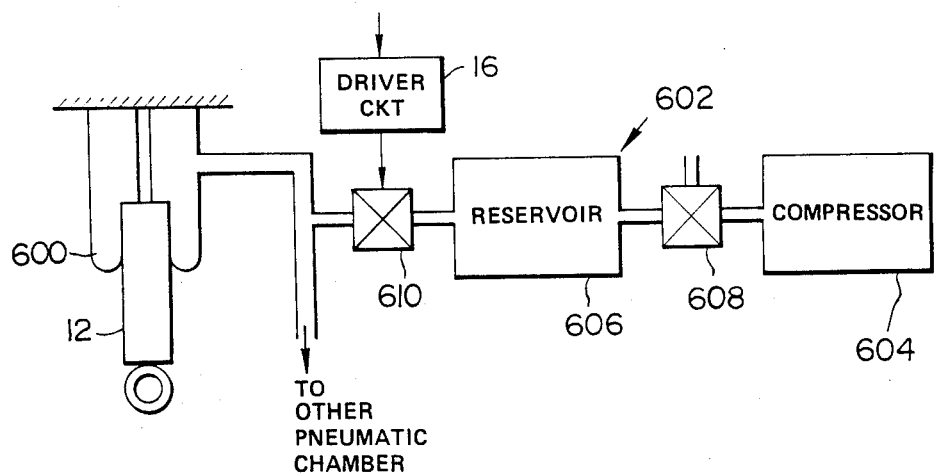

FIG. 15 is a schematic diagram of the third embodiment of a suspension control system in accordance with the present invention.

DESCRIPTION OF THE PREFERRED EMBODIMENTS

Figure 1:
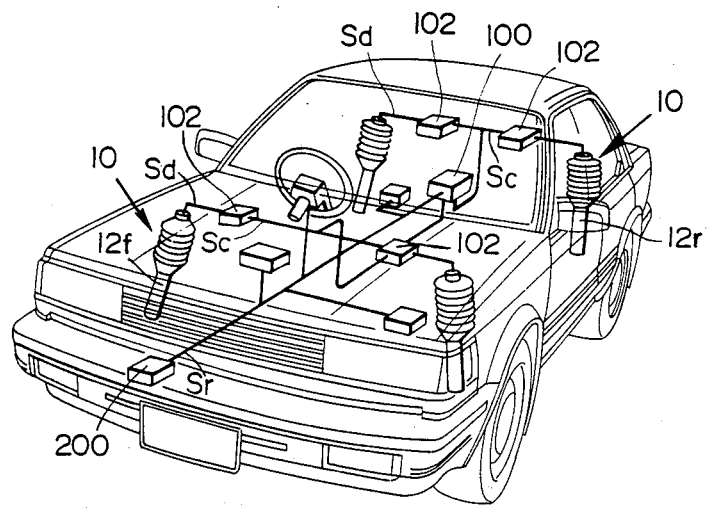

Referring now to the drawings, particularly to FIG. 1, the preferred embodiment of an electronic suspension control system in accordance with the present inveniton generally comprises suspension strut assemblies 10 in front and rear suspension, each including a shock absorber 12 with variable shock-absorbing characteristics and a controller 100 adapted to produce a control signal for actuating an actuator (not shown in FIG. 1) in each shock absorber 12 in order to adjust the shock-absorbing characteristics in accordance with the vehicle driving condition.

In practice, the preferred embodiment of the suspension control system is adapted to operate the actuators of the shock absorbers 12$f$ in the front suspension and the actuators of the shock absorbes 12$r$ in the rear suspension independently of each other. For this, the controller 100 outputs two different control signals for independently controlling the actuators of the shock absorbers 12$f$ and 12$r$ independently of each other. The control signal for controlling the actuator of the shock absorber 12$f$ of the front suspension will be referred to hereafter as the "front suspension control signal $S_{Fc}$". The control signal for controlling the actuator of the shock absorber 12$r$ of the rear suspension will be referred to hereafter as the "rear suspension control signal $S_{Rc}$".

It should be appreciated that the term "shock-absorbing characteristics" used throughout the disclosure refers to the quantitiative degree to which a shock absorber produces damping force or spring force against bounding and rebounding motion of the vehicle body as a sprung mass and the road wheel assembly as unsprung mass, and pitching and rolling movement of the vehicle body relative to the road wheel assembly. In practice, the shock-absorbing characteristics can be controlled in various ways based on flow restriction between shock absorber working chambers disposed in shock absorber cylinders. In the shown embodiment, the flow restriction is variable by means of a flow control valve disposed within a reciprocable piston separating the chambers. The preferred embodiment described herebelow employs a shock absorber with two-way variable shock-absorbing characteristics, i.e. HARD mode and SOFT mode. Obviously, in HARD mode, the damping force generated in response to bounding or rebounding shock applied to the vehicle is greater than in SOFT mode. However, the shown embodiment is to be considered merely as an example for facilitating better understanding of the invention and simplification of the disclosure. In fact, shock absorbers which operate in three modes, i.e. HARD mode, SOFT mode and INTERMEDIATE or MEDIUM mode, are also applicable to the preferred embodiment of the suspension control system according to the invention. Some possible modifications to the shock absorber will be disclosed together with the preferred shock absorber design given later.

It should be further noted that, throughout the disclosure, the word "bump" represents any irregularity on the road, such as a projection, a manhole projecting from the road surface, hole and so forth, which causes temporary bouncing motion of the vehicle.

Returning to FIG. 1, the controller 100 is connected to a road surface sensor 200 which produces a sensor signal $S_r$ indicative of road surface conditions, which will be referred to hereinafter as "road sensor signal $S_r$". The controller 100 may also be connected to a vehicle speed sensor 201. In practice, the vehicle speed sensor 201 is adapted to monitor rotation speed of a propeller shaft or drive shaft for deriving a vehicle speed indicative signal $S_v$ in a per se well known manner. The controller 100 is also connected to other sensors, such as a brake switch, etc., in order to receive the sensor signals indicative of the suspension control parameters. The controller 100 is, in turn, connected to driver signal generators 102 which are responsive to the front and rear control signals $S_{Fc}$ and $S_{Rc}$ from the controller, which control signals $S_{Fc}$ and $S_{Rc}$ can assume either of two states, namely HIGH and LOW. The driver signal generator 102 produces a drive signal $S_d$ which actuates the shock absorber to one of the HARD and SOFT modes.

The controller 100 is responsive to the road sensor signal $S_r$ and the vehicle speed indicative signal $S_v$ to produce the front and rear control signals $S_{Fc}$ and $S_{Rc}$ for switching the shock absorber between HARD mode and SOFT mode.

The controller 100 is also connected to a manually operable switch 202 for controlling the operation mode of the control system, which switch will be referred to hereafter as "auto/manual switch". The auto/manual witch 202 may be switched between MANUAL SOFT, MANUAL HARD and AUTO modes. In the MANUAL SOFT and MANUAL HARD modes, the damping characteristics of the front and rear suspensions are fixed at SOFT or HARD mode irrespective driving condition.

FIG. 2 shows the preferred first embodiment of the suspension control system including controller 100 which generally comprises a microprocesor. In practice, the microprocessor performs control operations. not only dependent upon the road surface conditions but also dependent upon vehicle speed, other vehicle driving conditions, such as vehicle acceleration, and other preselected suspension control parameters.

The microprocessor 100 generally comprises an input interface 102, CPU 104, RAM 106, ROM 108 and output interface 110. In the shown embodiment, the microprocessor 100 is connected to the road sensor 200 via the input interface 102. The microprocessor 100 is also connected for input from a clock generator 112. The road sensor, in the shown embodiment, comprises an ultra-sonic sensor, the construction and operation of which will be described herebelow. The ultra-sonic sensor 200 is associated with the controller 100. The output interface 110 of the microprocessor 100 is connected for output of control signal $S_c$ to each of the driver signal generators.

Figure 3:
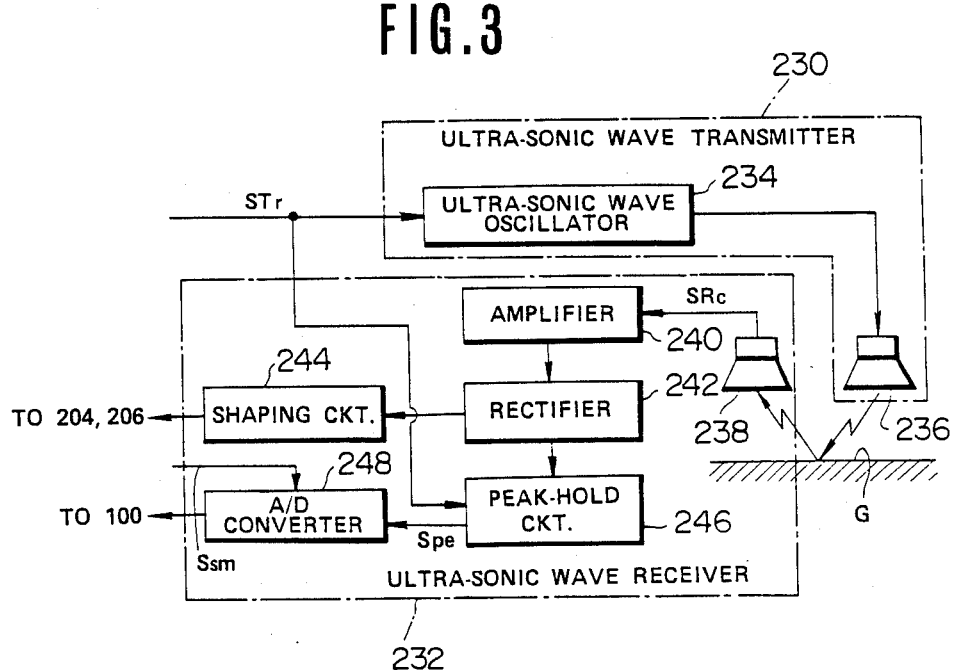

As shown in FIG. 3, the ultra-sonic sensor 202 comprises generally an ultra-sonic wave transmitter 230 and a reflected ultra-sonic wave receiver 232. The transmitter 230 is associated with the controller 100 to receive therefrom a trigger signal $S_{Tr}$ at a given timing. The transmitter 230 includes an ultra-sonic oscillator 234 and an ultra-sonic wave transmitting section 236. The ultra-sonic oscillator 234 is responsive to the trigger signal $S_{Tr}$ from the controller 100, which is issued periodically or intermittently, to transmit or discharge ultra-sonic waves through the transmitter section 236 toward the road surface.

The ultra-sonic waves reflected by the road surface are received by a receiver section 238 of the receiver 232. The receiver section 238 produces a receiver signal $S_{Rc}$ having value varying in accordance with the amplitude of the received ultra-sonic waves. The receiver section 238 is connected to an amplifier 240 to supply the receiver signal $S_{Rc}$ to the latter. The receiver signal $S_{Rc}$ is amplified by the amplifier 240 and transmitted to a rectifier 242. The rectifier 242 is connected to the band-pass filters 204 and 206 as set forth above, through a shaping circuit 244. The rectifier 242 is also connected to a peak-hold circuit 246 which holds the peak value of the receiver signal. The peak-hold circuit 246 produces an analog peak-value-indicative signal $S_{Pe}$ having a value proportional to the held peak value. The peak-hold circuit 246 is connected for output to the controller 100 via an analog-to-digital converter 248. The analog-to-digital converter 248 outputs a binary signal indicative of the peak-value-indicative signal value to the controller 100.

The peak-hold circuit 246 is also connected to the controller 100 to receive the trigger signal $S_{Tr}$. The peak-hold circuit 246 is responsive to the trigger signal from the controller to clear the currently held value.

Figure 4:
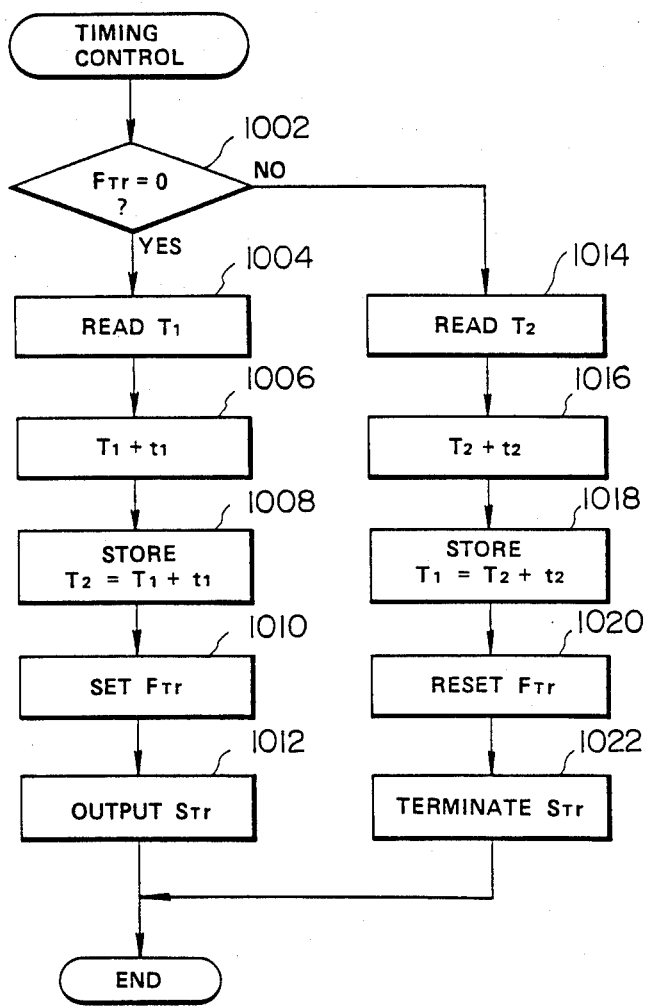

FIG. 4 shows a timing control program executed by the controller 100 for controlling the trigger timing of the ultra-sonic sensor 200.

At the initial stage of execution of the tiing control program, a trigger-signal-output-indicative flag $F_{Tr}$ in a memory block 120 of RAM is checked at a step 1002. The trigger signal $F_{Tr}$ is set when the trigger signal is output through the output interface 110 to the transmitter 230 and is reset when the trigger signal is not being output.

If the trigger signal-indicative flag $F_{Tr}$ is set when checked at the step 1002, then the timer value $T_1$ of a timer 122 in RAM is latched at a step 1004. The timer 122 continuously counts clock pulses from the clock generator 112. A trigger-signal-ON-time indicative time value $t_1$ is added to the latched timer value $T_1$ at a step 1006. The resultant value $(T_1+t_1)$, which serves as a trigger-signal-OFF time value, is transferred to and stored in a $T_2$-register 124 in RAM 106, at a step 1008. Then the flag $F_{Tr}$ is set at a step 1010. A HIGH-level output is applied to the output interface as trigger signal $S_{Tr}$ at a step 1012.

During the period $t_1$ starting from the time $T_1$, the potential at the output interface is held HIGH to continue application of the trigger signal $S_{Tr}$ to the transmitter 230. The timer 124 continues counting the clock pulses and proudces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal-indicative flag $F_{Tr}$ was set at the step 1010 in the previous cycle of program execution, the answer at the step 1002 becomes "NO". Thus, control passes to a step 1014 in which the timer value $T_2$ of the second timer 125 is accessed in RAM 106. Similarly to the first-mentioned timer 124, the timer 125 continuously counts clock pulses from the clock generator 112. An OFF-interval-indicative time data $t_2$ is added to the latched timer value $T_2$ at a step 1016. The time data $t_2$ has a value corresponding to a predetermined interval between successive trigger signals. The resultant time value $(T_2+t_2)$ is stored in the $T_1$-timer 124 of RAM 106 at a step 1018. Then, the flag $F_{Tr}$ is reset at a step 1020. After the step 1020, the output level at the output interface drops to LOW to terminate transmission of the trigger signal to the transmitter, at a step 1022.

The detailed structure and operation of the aforementioned preferred embodiment of the ultra-sonic sensor has been disclosed in the co-pending U.S. patent application Ser. No. 650,705, filed Sept. 14, 1984. The disclosure of the above-identified U.S. patent application Ser. No. 650,705 is hereby incorporated by reference for the sake of disclosure.

Figure 6:
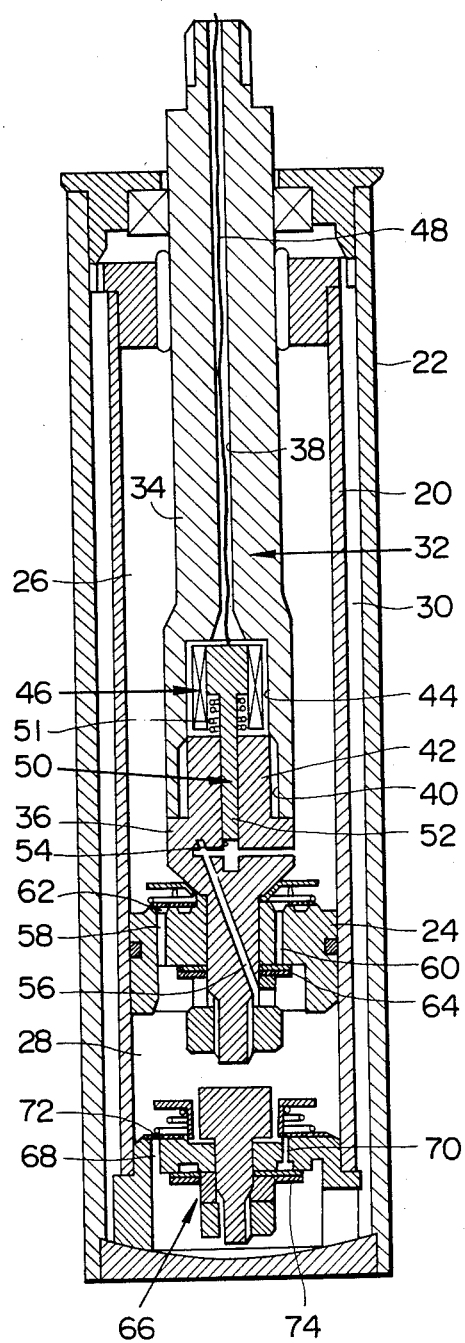

FIG. 6 shows the detailed structure of a variable-damping-force shock absorber 12 employed in the first embodiment of the suspension control system according to the present invention. The shock absorber 12 generally comprises inner and ouer hollow cylinders 20 and 22 arranged coaxially, and a piston 24 fitting flush within the hollow interior of the inner cylinder 20. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 comprises upper and lower segments 34 and 36. The upper segment 34 is formed with an axially extending through opening 38. The lower end of the through opening 38 opens into a recess 40 defined on the lower end of the upper segment 34. On the other hand, the lower segment 36 has an upper section 42 engageable in the recess 40 to define therein a hollow space 44. An actuator is disposed within the space 44. The actuator 46 is connected to the driver circuit 16 through a lead 48 extending through the through opening 38. The actuator 46 is associated with a movable valve body 50 which has a lower end extension 52 inserted into a guide opening 54 defined in the lower segment 36. The guide opening 54 extends across a fluid passage 56 defined through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drop in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the pasage 56 with the lower end extension 52. As a result, fluid communication between the upper and lower fluid chambers 26 and 28 via the fluid passage 56 is blocked. When fluid communication through the fluid passage is permitted, the damping force produced by the shock absorber 14 remains LOW. On the other hand, when the fluid passage 56 is shut, fluid flow rate is reduced, thus increasing the damping force produced. Therefore, when the valve body 50 is shifted to the lowred position, the shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

In the normal state wherein the control signal of the controller 100 remains LOW, the movable valve body 50 is held in its upper position by the effect of the spring force 51 so that the lower end extension 52 does not project into the fluid passage 56. Therefore, the fluid communication is established through both the fluid passage 56 and the applicable one of the flow-restricting fluid passages 58 and 60. As a result, the total flow restriction is relatively weak to allow the shock absorber to operate in SOFT mode.

In response to a HIGH-level control signal from the controller 100, the driver signal generator 102 corresponding to each shock absorber 12 becomes active to energize the actuator 46. The actuator 46 drives the movable valve body 50 downward. This downward movement shifts the lower end of the extension 52 of the valve body 50 into the fluid passage 56 so as to block fluid communication between the upper and lower fluid chambers 26 and 28 via the fluid passage 56. Therefore, the fluid can flow between the upper and lower chambers 26 and 28 only through one of the fluid passages 58 and 60. The fluid flow restriction is, thus, increased, resulting in a greater damping force than is produced in the SOFT mode. In other words, the shock absorber 12 operates in HARD mode.

Operation of the aforementioned first embodiment of the suspension control system in accordance with the present invention will be described herebelow with reference FIG. 5.

Figure 5:
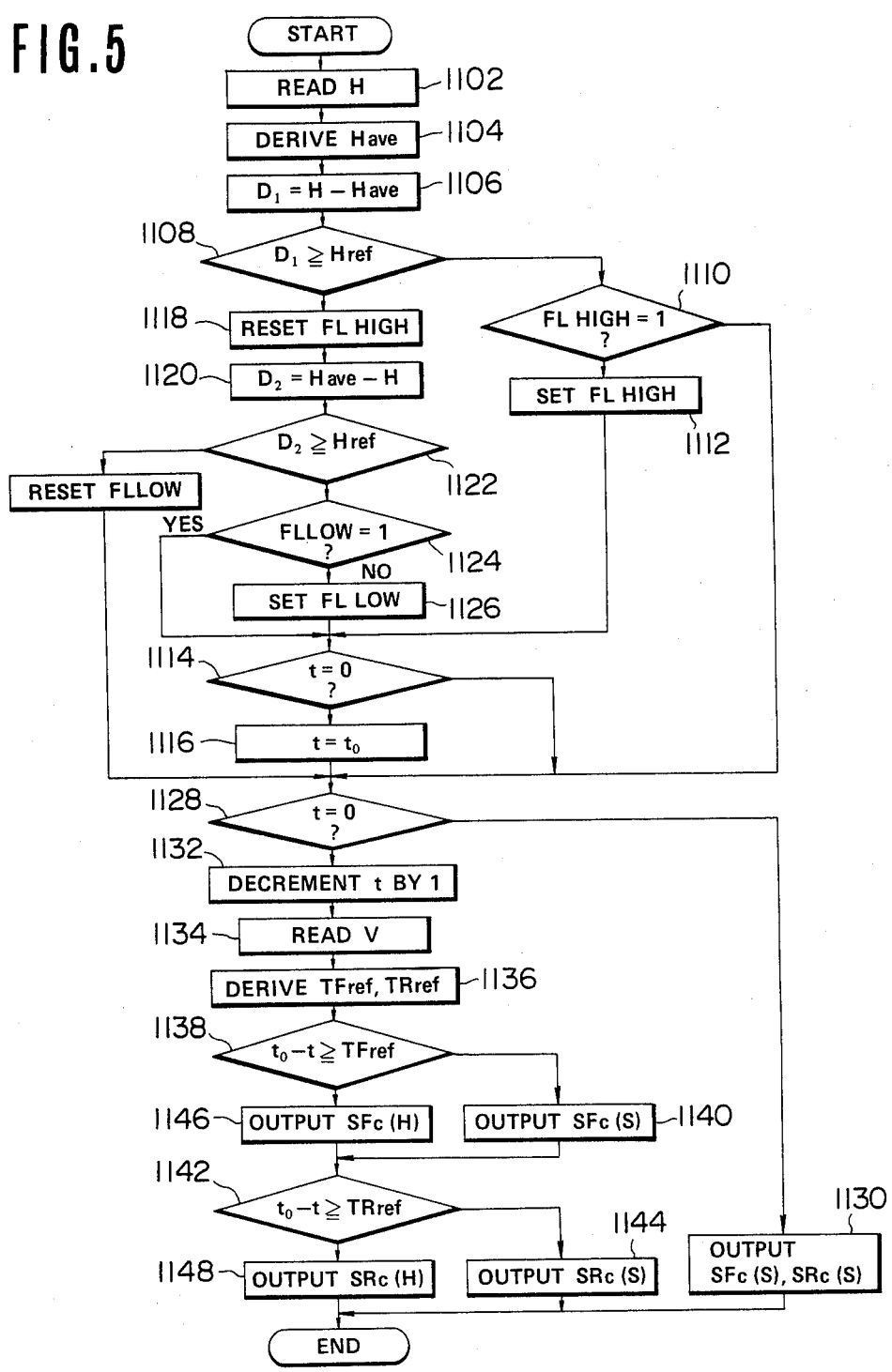

FIG. 5 shows a suspension control program to be cyclically executed at a predetermined timing. Immediately after starting execution, the instantaneous value H of the road sensor signal Sr, which is representative of a vehicle height from the road surface, is read out at a step 1102. Then, an average value $H_{ave}$ is calculated at a step 1104.

In practice, average value $H_{ave}$ of the road sensor signal value H is calculated by adding a value derived from the instantaneous road sensor signal value H according to the following equation:

$$H_{ave} = H_{ave0} + 1/64 \cdot (H - H_{ave0})$$

where $H_{ave0}$ is the average value of the road sensor signal value derived in the immediately preceding cycle of program execution.

At a step 1106, $(H - H_{ave})$ is calculated in order to derive a difference value $D_1$. The derived difference value $D_1$ is compared with a predetermined reference value $H_{ref}$ which is representative of a harder suspension criteria, at a step 1108. When the difference value $D_1$ is equal to or greater than the reference value $H_{ref}$, a higher vehicle height indicative flag FLHIGH is checked at a step 1110, which flag FLHIGH is to be set in the memory block 114 of RAM 106 when the difference value $D_1$ is equal to or greater than the reference value $H_{ref}$. When the higher vehicle height indicative flag FLHIGH is not set as checked at the step 1110, it is set at a step 1112. Thereafter, a value t of a timer 121, which is adapted to be set a predetermined $t_0$ and counted down by clock pulses from a clock generator 112, is checked to see whether the value t is zero, at a step 1114. If the timer value t is zero as checked at a step 1114, the timer 121 is set by the predetermined value $t_0$ at a step 1116.

On the other hand, when the difference value $D_1$ is smaller that the reference value $H_{ref}$, the higher vehicle height indicative flag FLHIGH is reset at a step 1118. Thereafter, $(H_{ref} - H)$ is calculated in order to derive a difference value $D_2$ at a step 1120. The derived difference value $D_2$ is compared with the reference $H_{ref}$ at a step 1122. When the difference value $D_2$ is equal to or greater then the reference value $H_{ref}$, a lower vehicle height indicative flag FLLOW which is set/reset in a memory block 115 of RAM 106 is checked at a step 1124. When the flag FLLOW is not set as checked at the step 1124, the process goes to the step 1114.

If the difference value $D_2$ is smaller than the reference value $H_{ref}$ as checked at the step 1120, the lower vehicle height indicative flag FLLOW is reset at a step 1126. Thereafter, the timer value t is checked at a step 1128, to see whether the timer value t is zero. When the timer value t is zero as checked at the step 1128, then front and rear suspension control signals SFc and SRc are roduced to operate the shock absorbers 12 into SOFT mode, at a step 1130. On the otherhand, when the timer value t is not zero as checked at the step 1128, the timer value t is decremented by 1 in response to clock pulse from the clock generator 112, at a step 1132.

Thereafter, a counter value V of a vehicle speed counter 123 which is adapted to count pulses form vehicle speed indicative signals from the vehicle speed sensor 111, is read out at a step 1134. Derivation of the vehicle speed by counting the vehicle speed indicative signal from the vehicle speed sensor 111 is per se will known and needs no detailed description.

On the basis of the counter value V, a front suspension timer threshold $TF_{ref}$ and a rear suspension timer threshold $TR_{ref}$ are derived at a step 1136. It should be noted that the front suspension timer threshold $TF_{ref}$ corresponds a possible elapsed time for the front wheels to reach a pont after the road sensor passes over that point. Similarly, the rear suspension timer threshold $TR_{ref}$ corresponds a possible elapsed time for the rear wheels to reach a point after the road sensor passes over that point. Therefore, the thresholds $TF_{ref}$ and $TR_{ref}$ are generally depend on the distance between the road sensor and the front and rear wheel axles. Since the elapsed time is variable depending upon the vehicle speed, the front and rear suspension timer thresholds $TF_{ref}$ and $TR_{ref}$ vary depending on the vehicle speed V. In practice, the front and rear suspension timer thresholds $TF_{ref}$ and $TR_{ref}$ would be derived by table look-up from tables 122 and 123 in terms of the vehicle speed counter value V.

The elapsed time $(T_0 - t)$ is then compared with the front suspension timer threshold $TF_{ref}$ at a step 1138. As long as the elapsed time value $(T_0 - t)$ is smaller than the front suspension timer threshold $TF_{ref}$, the front suspension control signal $SF_c$ to control the shock absorbers in the front suspension into SOFT mode is output, at a step 1140. Thereafter, the elapsed timer value $(T_0 - t)$ is compared with the rear suspension timer threshold $TR_{ref}$ at a step 1142. Similarly to the above, as long as the elapsed time value is smaller than the rear suspension timer threshold, the rear suspension control signal SRc for operating the shock absorbers in the rear suspensions into SOFT mode is produced, at step 1144.

If the elapsed timer value $(T_0 - t)$ becomes equal to or greater than the front suspension timer threshold $TF_{ref}$ as checked at the step 1138, the front suspension control signal SFc to operate the shock absorbers in the front suspension into HARD mode is produced at a step 1146. Similarly, when the elapsed time becomes equal to or greater than the rear suspension timer threshold $TR_{ref}$ as checked at the step 1140, the rear suspension control signal SRc for operating the shock absorbers 12 in the rear suspension into HARD mode, is produced at a step 1148.

When reset state of the higher vehicle height indicative flag FLHIGH is detected as checked at the step 1108 process also jumps to the step 1128. Also, when the timer value t as checked at the step 1114 is not zero, process jumps to the step 1128. Similarly, after setting the timer value t to the initial value $T_0$ at the step 1116, process jumps to the step 1128.

As will be appreciated herefrom, the hardening timing of the front and rear suspensions are different from the timing of detecting the bump as set forth above, and thus successfully adjusted so that each of the front and rear suspensions is hardened upon the front and rear wheels passing over the bump. This assures riding comfort and driving stability in a more precise manner that that in the prior art.

It should be noted that it would be preferable to provide another delay time for switching the mode of the shock absorbers from the HARD mode to the SOFT mode after passing the bump for preventing the control system for causing hunting on the undulating road, gravel road and so forth.

Figure 7:
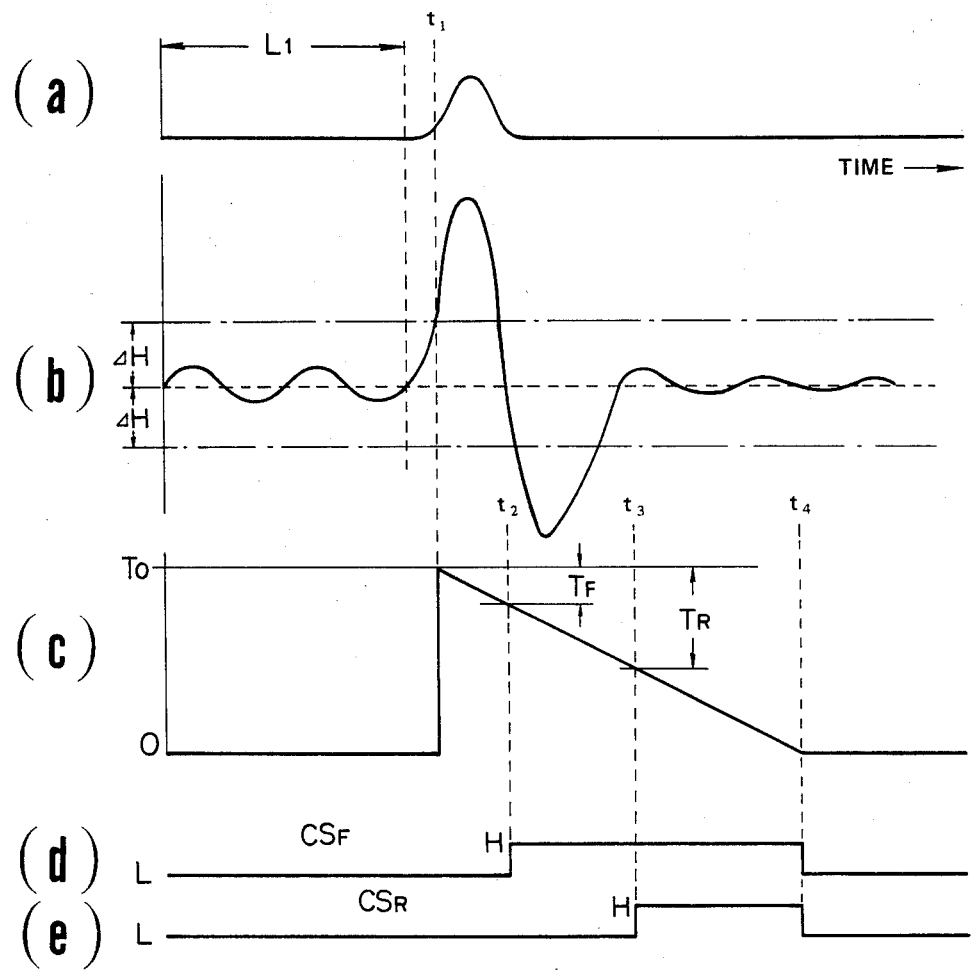

The suspension control operation to be taken place by the aforementioned first embodiment of the suspension control system according to the invention will be described herebelow with reference to FIG. 7. In FIG. 7, the line (a) represents road surface condition. As will be appreciated from the line (a) the example illustrated is directed for substantially smooth road with a bump. While the vehicle is on the smooth road surface and thus the road sensor 200 does not detect the bump, the road sensor signal value H varies within the range defined by the reference value $H_{ref}$, as represented by the line (b) in FIG. 6. Therefore, the timer value t is maintained at zero. As a result, the front and rear suspension control signals $S_{Fc}$ and $S_{Rc}$ order SOFT mode of the shock absorbers 12f and 12r.

When the vehicle approaches the bump and the road sensor 200 detects the bump. The road sensor signal value H increases to a significant level so that the difference between the average value $H_{ave}$ becomes greater than the reference value $H_{ref}$. This causes setting of the timer value t to the initial value $t_0$ at a time $t_1$. In response to setting of the timer value to $t_0$, the front suspension timer threshold $TF_{ref}$ and the rear suspension timer threshold $TR_{ref}$ are derived in terms of the vehicle speed indicative signal value V. When the timer value t is decremented to a value equal to or smaller than front suspension timer threshold $TF_{ref}$ at a time $t_2$, the front suspension control signal $S_{Fc}$ changes its value to order the HARD mode. As appreciated from FIG. 6, since the rear suspension timer threshold $TR_{ref}$ defines a longer elapsed time than that of the front suspension timer threshold $TF_{ref}$, the rear suspension control signal $S_{Rc}$ remains unchanged to maintain the SOFT mode for the rar suspension. At a time $t_3$, the timer value t is decremented below the rear suspension timer threshold $TR_{ref}$. Then, the rear suspension control signal $S_{Rc}$ is changed to order the HARD mode.

When the timer value t is decremented to zero at a time $t_4$, the front and rear suspension control signals $S_{Fc}$ and $S_{Rc}$ change to order the SOFT mode.

Though the first embodiment of the suspension control systems as set forth above employs two-way variable damping characteristics shock absorbers for varying the damping characteristics of the suspension between HARD mode and SOFT mode, it would be possible to employ shock absorbers which vary the damping characteristics in more than two-ways. For example, a shock absorber having a three-way variable damping characteristic, i.e. HARD mode, MEDIUM mode and SOFT mode, is applicable for the foregoing first embodiment of the suspension control system. FIGS. 8 to 11 show a modification of the variable-damping-characteristic shock absorber of FIG. 9. In this modification, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 304 and 302. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 314 reciprocally housed within the inner cylinder 304 and defining upper and lower fluid chambers 316 and 318 therein.

The piston 314 has fluid passages 320 and 322 connecting the upper and lower fluid chambers 316 and 318. The piston 314 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 323 prevents fluid flow through the fluid passage 320. On the other hand, during the piston compression stroke. i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

As shown in FIG. 9, the piston rod 308 defines an axially extending through opening 404 with the lower end opening into the lower fluid chamber 318. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 308 also has one or more radially extending orifices or openings 414 opening into the upper fluid chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

As shown in FIGS. 11(A) and 11(B), the orifices 424 and 426 respectively include first, second and third orifices 424a, 424b, 424c, and 426a, 426b, and 426c. The first orifices 424a and 426b have the narrowest cross-sections and the orifices 432 and 434 are adapted to be in alignment with the first orifices to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426b are intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This causes the bound damping force to be somewhat weaker than the rebound damping force.

The rotary valve member 430 is associated with an electrically operable actuator such as an electrical step motor 442 through a differential gear unit 444 and an output shaft 446 as shown in FIG. 10. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to a controller 100 to receive the control signal as a mode selector signal which drives the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 8, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIGS. 11. FIGS. 11(A) and 11(B) show the case of the HARD mode. In this case, the orifice 432 of the rotary valve 430 is in alignment with the orifice 424a and the orifice 434 is in alignment with the orifice 426a. During vehicle rebounding motion, i.e., in the piston expansion stroke, the fluid flows from the upper fluid chamber 316 to the lower fluid chamber 318 though the orifice 326a. On the other hand, during vehicle bounding motion, the fluid flows from the lower fluid chamber 318 to the upper fluid chamber 316 through orifices 424a and 426a. Since the first orifices 424a and 426a are the narrowest, the damping force produced in this mode is the highest among the three selectable modes.

In case of the MEDIUM mode the orifices 432 and 434 of the rotary valve member 340 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 16. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 16 is responsive to the control signal to drive the step motor 442 to operate the rotary valve member 430 to the corresponding valve position.

As an alternative in the modification set forth above, only SOFT and MEDIUM modes may be used for road-condition-dependent suspension control. Therefore, when the HARD mode is selected in the foregoing first embodiment set forth above the controller 100 actuates the shock absorber to MEDIUM mode.

FIGS. 12 to 14 show the structure of a roll stabilizer 530 to be controlled by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearing sections 538 and 540 at both ends. The parallel bar sections 534 and 536 have end segments 542 and 544 of circular cross-section adapted to rotatably engage the bearings 538 and 540 of the transverse bear section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearing portion 538 and 540. Like plates 554 and 556 and rigidly fitted onto the protruding ends of the parallel bar sections 534 and 536. The link plates 554 and 556 are rotatable about the bearing sections 538 and 540 together with the parallel bar sections 534 and 536. The link plates are connected to each other through a linkage 558. In addition, the link plate 554 is associated with an actuator 560 through an actuation rod 562 engaging an elongated opening 563 of the link plate 554. The actuator 560 may comprise an electromagnetically operative solenoid. The actuator is adapted to be energized by a control signal fed from a controller 100 to rotate the link plate 444 along with the parallel bar section 534 through 90° from the shown neutral position. When the actuator 560 is energized, the link plate 556 is also rotated according to rotation of the link plate 554 to pivot the parallel bar 536 through 90° within the bearing section 540.

As shown in FIG. 14, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position, the bending stress on the parallel bar sections 534 and 536 is increased, i.e., the torsion on the transverse bar section 532 of the stabilizer is increase.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the road surface condition indicative signal value remains less than the threshold value which is also derived in accordance with the vehicle speed.

When the steering angle change matches or exceeds the threshold value, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

FIG. 15 shows another arrangement of the automative suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure control valve 610. The pressure control valve 620 connected to the driver circuit 16 to be controlled thereby. In the induction mode, the fluid reservoir 606 is connected to the compressor 604 to receive the pressurized fluid. On the other hand, the fluid reservoir 606 is open to atmosphere to decrease the fluid pressure in the ventilation mode of the induction valve.

The pressure control valve 610 is co-operative with the induction valve 608 to adjust the fluid pressure in the pneumatic chamber 600 in accordance with vehicle driving conditions.

According to the shown embodiment, the driver circuit 16 may be connected to the control system of any of the first embodiment so that it is activated in response to road roughness. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the rough road which causes relatively low-frequency of vibration on the vehicle body as detected by the manner as set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The above-mentioned suspension system structure of FIG. 15 has been disclosed in U.S. Pat. No. 4,349,077 of Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European patent application No. 84100729.7, filed on Jan. 24, 1984. The contents of the above-identified U.S. Patents and the co-pending applications are hereby incorporated by reference.

Road surface condition dependent suspension control can also be achieved with this suspension system. When road roughness requires harder suspension, the pressure control valve 610 is closed to block fluid communication between the pneumatic chamber 600 and the reservoir in order to increase the stiffness of the strut assembly and so produce a greater damping force with which to suppress vibration of the vehicle body. On the other hand, on relatively smooth road surface conditions, the pressure control valve 610 remains open, allowing fluid communication between the pneumatic chamber and the reservoir chamber. As a result, sufficiently soft-shock-absorbing characteristics can be provided to ensure good riding comfort.

As set forth above, according to the present invention, the vehicular suspension can provide both riding comfort and good drivability by controlling hardness of the suspension depending upon the road surface conditions.

It should be noted that although the shown embodiments control the damping force and/or rigidity of the suspension system by adjusting the damping characteristics of the suspension strut assemblies, it would be also be possible to perform suspension control by adjusting the rigidity of a roll-stabilizer employed in the vehicle suspension. Such variable spring-force or damping-force stabilizers for vehicle suspension systems have been illustrated in the co-pending U.S. patent application Ser. No. 647,648, filed Sept. 6, 1984. The contents of the above-identified co-pending U.S. Patent Application are hereby incorporated by reference for the sake of disclosure.

What is claimed is:

1. A suspension control system for a vehicle comprising:
   front and rear wheels;
   front and rear suspension systems connected, respectively, to said front and rear wheels, and having variable damping characteristics such that said front and rear suspension systems can operate in at least a first operation mode where a relatively low damping characteristic is obtained and a second operation mode where a relativvely high damping characteristic is obtained, the operation modes of said front and rear suspension systems being variable independently of each other;
   a road sensor for monitoring roughness of a surface and producing a road condition indicative signal, said road sensor being mounted at different positional relationships relative to said front and rear wheels;
   a speed sensor for producing a signal indicative of a speed of travel of said front and rear wheels;
   a controller for determining a proper operation mode of said front and rear suspension systems on the basis of said road condition indicative signal and for producing control signals for controlling the front and rear suspensions independently of each other, said controller comparing said road condition indicative signal with a threshold value representative of a road surface requiring a relatively high damping characteristic and being responsive to said road condition indicative signal having a value greater than said threshold value to produce said control signal for controlling said front suspension to operate in said second mode at a first timing which is determined on the basis of said speed indicative signal and the positional relationship of said sensor relative to said front wheels and produce said control signal for controlling said rear suspension to operate in said second mode at a second timing which is different from said first timing and is determined on the basis of said speed indicative signal and the positional relationship of said road sensor to said rear wheels.

2. The suspension control system as set forth in claim 1, wherein said controller varies said threshold depending upon the vehicle speed indicative signal value.

3. The suspension control system as set forth in claim 1, wherein said controller detects bounding of the vehicle due to passing over a bump on the road for controlling said front and rear suspensions to operate in said second mode at said first and second timings.

4. The suspension control system as set forth in claim 3, wherein said road sensor is provided in front of said front wheels and said first and second timings include first and second time delays, respectively, and said first delay time is shorter than said second delay time by a duration corresponding to the distance between said front and rear suspensions.

5. The suspension control system, as set forth in claim 4, wherein said road sensor is in front of said front suspension and said first delay time corresponds to the distance between said road sensor and said front suspension.

6. The suspension control system as set forth in claim 5, wherein said controller varies said first and second delay times on the basis of said vehicle speed indicative signal value.

7. The suspension control system as set forth in claim 1, wherein each of said front and rear suspensions comprises a hydraulic shock absorber which has damping characteristics that are variable at least between said first mode and said second mode.

8. The suspension control system as set forth in claim 7, wherein said hydraulic shock absorber comprises upper and lower fluid chambers filled with a working fluid, said chambers having respective volumes which are variable according to a piston stroke, said shock absorber being provided with a flow control value which has a valve position that is variable between a first mode position for restricting a flow rate of working fluid from one of said upper and lower fluid chambers to the other through a flow path at a minimum rate, and a second mode position for allowing fluid flow through said flow path at a maximum rate.

9. The suspension control system as set forth in claim 8, wherein said flow control valve is further constructed to vary damping characteristics in one of said first and second mode positions, according to piston stroke direction.

10. The suspension control system as set forth in claim 9, wherein said flow control valve allows a smaller rate of fluid flow through a flow path during a piston expansion stroke than that during a piston compression stroke.

11. The suspension control system as set forth in claim 1, wherein each of said front and rear suspensions comprises a stabilizer which has a stiffness that is variable at least between said first mode and said second mode.

12. The suspension control system as set forth in claim 1, wherein each of said front and rear suspensions comprises a pneumatic spring means providing a pneumatic damping force for the corresponding suspension, which pneumatic spring means has a pneumatic pressure which is variable at least between said first mode and said second mode.

13. The suspension control system as set forth in claim 1, wherein said road sensor comprises an ultrasonic sensor transmitting in ultra-sonic wave signal to a road surface and receiving the ultra-sonic wave signal reflected by the road surface, to monitor an inteval between transmitting the ultra-sonic wave signal and receiving the reflected signal for deriving an indication of vehicle level relative to the road surface.

14. The suspension control system as set forth in claim 13, wherein said controller receives said road condition indicative signal produced by said ultra-sonic sensor, monitors variations of said road condition indicative signal value to judge roughness of the road surface, and compares a variation magnitude of said road condition indicative signal value with said threshold value for controlling said front and rear suspensions to operate in said first mode a said first and second timings when said variation magnitude is greater than said threshold value.

15. A method for controlling damping characteristics of front and rear vehicular suspension systems for front and rear vehicle wheels, each of which has damping characteristics which are variable at least between a first harder suspension mode and a second softer suspension mode according to a preselected suspension control parameter, comprising the steps of:
providing a single road sensor which monitors roughness of the road surface and produces a road condition indicative signal having a value which varies depending on the roughness of the road surface, said road sensor having a first positional relationship relative to said front wheel and having a second positional relationship relative to said rear wheel;
providing a vehicle speed sensor for monitoring vehicle speed and producing a vehicle speed signal indicative of the vehicle speed;
detecting an irregularity of the road surface which has a magnitude greater than a predetermined criteria;
controlling damping characteristics of said front suspension system to cause said front suspension system to operate in said first mode at a first timing relative to a time at which the irregularity of the road surface of the greater magnitude that said criteria is detected; and
controlling damping characteristics of said rear suspension system to cause said rear suspension system to operate in said first mode at a second timing relative to a time at which the irregularity of the road surface of the greater magnitude that said criteria is detected;
said first timing being determined based on said first positional relationship and on said vehicle speed;
said second timing being determined based on said second positional relationship and on said vehicle speed.

16. A system for a vehicle, comprising:
a vehicle wheel;
a suspension system for suspending said vehicle wheel, said suspension system being variable in damping rate at least between a first softer damping characteristic mode and a second harder damping characterisic mode;
a road sensor for monitoring roughness of a road surface on which said vehicle is travelling and producing a road condition indicative signal;
a vehicle speed sensor for monitoring vehicle speed and producing a speed sensor signal having a value representative of the speed of the vehicle; and
a controller for normally outputting a first control signal to said suspension system for causing said suspension system to operate in said softer damping characterisic mode, said controller being connected to receive said road condition indicative signal and determining the presence of an irregularity on said road surface based on said road condition indicative signal, and for outputting a second control signal to said suspension system at a first timing to cause said suspension system to operate in said harder damping characteristic mode when the presence of said irregularity is determined, said first timing being determined such that said suspension system is operated in said harder damping charcteristic mode at least after said wheel has passed over said irregularity, and said controller sending said first control signal to said suspension system at a second timing for causing said suspension system to operate in said softer damping characteristic mode, said second timing being determined such that said suspension is maintained in said harder damping characteristic mode for a certain period of time after said wheel has passed over said irregularity.

17. A system as called for in claim 16, wherein said controller determines said first timing based on said vehicle speed signal and a known positional relationship between said road sensor and said vehicle wheel.

18. A system as called for in claim 16, wherein said vehicle wheel is a front wheel and further including a rear wheel, and wherein said suspension system includes front and rear suspensions for mounting said front and rear vehicle wheels, each of said front and rear suspensions being variable between said first and second modes, and wherein said first timing includes a front suspension timing at which said controller controls said front suspension to operate in said second mode when said front wheel moves over said irregularity and after said front wheel moves over said irregularity, and a rear suspension timing at which said controller controls said rear suspension to operate in said second mode when said rear wheel moves over said irregularity and after said rear wheel moves over said irregularity.

19. A system as called for in claim 16, wherein said controller controls said suspension to operate in said second mode for a fixed predetermined time after said wheel has moved over said irregularity.

20. A system as called for in claim 18, wherein said road sensor is located a first predetermined distance in front of said front wheel and a second predetermined distance in front of said rear wheel, and wherein said front suspension timing includes a first time delay determined based on the vehicle speed and said first predetermined distance, and said rear suspension timing includes a second time delay determined based on the vehicle speed and said second predetermined distance.

21. A system for a vehicle, comprising:
front wheels;
rear wheels;
front and rear suspension systems for suspending the front and rear wheels, said suspension systems having damping characteristics which are variable at least between a first mode where relatively low damping characteristics are obtained and a second mode where relatively high damping characteristics are obtained, said front and rear suspension systems being variable independently of each other;
a road sensor for monitoring a condition of a road on which said vehicle is travelling and producing a road condition indicative signal, said road sensor being located in a first positional relationship relative to said front wheels and a second positional relationship relative to said rear wheels;
a vehicle speed sensor for monitoring vehicle speed and producing a vehicle speed indicative signal; and
a controller for sending control signals to said front and rear suspension systems to cause said front and rear suspension systems to operate in said first and second modes, said controller normally sending control signals for causing said suspension systems to operate in said first mode, said controller being responsive to said road sensor for sending control signals to said front and rear suspension systems when said road condition indicative signal becomes greater than a predetermined value to indicate a road roughness of a predetermined amount, said control signal for causing said suspension systems to operate in said second mode being sent to said front suspension system at a first timing relative to a time when said road condition signal becomes greater than said predetermined value and being sent to said rear suspension system at a second timing relative to said time when said road condition signal becomes greater than said predetermined value, and said controller sending a signal to control said suspension systems to operate in said first mode at a third timing such that said suspension systems operate in said second mode at least for a short time after said wheels pass said roughness in order to prevent hunting.

22. A system as called for in claim 21, wherein said road sensor is located at a first distance in front of said front wheels and at second distance in front of said rear wheels, said controller deriving said first timing based on said vehicle speed and said first distance such that said front suspension system operates in said second mode when said front wheels travel over said roughness, and said controller derives said second timing based on said second distance and said vehicle speed such that said rear suspension system operates in said second mode when said rear wheels travel over said roughness, and said controller derives said third timing based on a predetermined time delay which is sufficiently long to ensure that said rear suspension system is operated in said second mode for at least a short period after passing over said roughness.

23. A system as called for in claim 21, wherein said second timing includes a time delay which is determined based on a wheelbase of the vehicle and said vehicle speed indicative signal.

24. A system as called for in claim 21, wherein said road sensor is positioned in front of said front wheels and said first timing includes a time delay which is determined based on the distance of said road sensor form said front wheels and the vehicle speed.

* * * * *